United States Patent [19]
Pohl et al.

[11] Patent Number: 5,343,350
[45] Date of Patent: Aug. 30, 1994

[54] CIRCUIT CONFIGURATION FOR PROTECTING THE ON-BOARD ELECTRICAL SYSTEM OF A MOTOR VEHICLE

[75] Inventors: Klaus Pohl, augsburg; Alfons Fisch, Falkenstein, both of Fed. Rep. of Germany

[73] Assignee: Siemens Aktiengesellschaft, Munich, Fed. Rep. of Germany

[21] Appl. No.: 860,091

[22] Filed: Mar. 30, 1992

[30] Foreign Application Priority Data

Mar. 28, 1991 [EP] European Pat. Off. ........ 91105065.6

[51] Int. Cl.⁵ ............................................. H02H 9/02
[52] U.S. Cl. ........................................ 361/18; 361/91; 361/93
[58] Field of Search .................. 361/18, 57, 91, 92, 361/93, 56

[56] References Cited
U.S. PATENT DOCUMENTS

| | | | |
|---|---|---|---|
| 3,924,154 | 12/1975 | Minks | 361/18 |
| 4,594,633 | 6/1986 | townsend et al. | 361/87 |
| 4,723,191 | 2/1988 | Menniti | 361/92 |

FOREIGN PATENT DOCUMENTS 3706264 9/1988 Fed. Rep. of Germany ......... H02H 3/24
2634601 1/1990 France ........................... H02H 9/04

OTHER PUBLICATIONS

IBM Technical Disclosure Bulletin, vol. 18, No. 8, Jan. 1976, Maddox, p. 2430.
IBM Technical Disclosure Bulletin, vol. 5, No. 11, Apr. 1963, Erdman, Jr. p. 51.

*Primary Examiner*—Jeffrey A. Gaffin
*Assistant Examiner*—S. Jackson
*Attorney, Agent, or Firm*—Herbert L. Lerner; Laurence A. Greenberg

[57] ABSTRACT

A circuit configuration for protecting the on-board electrical system of a motor vehicle includes an input connected to a voltage source, an output connected to a load and a ground connection being common to both the input and the output. A current stabilizer regulates an output current. A switch controls the current stabilizer as a function of the output current. An overload switch carries an overload current from the input through the current limiter to the output upon the appearance of an overload at the output, and carries a short-circuit current from the output through the excess voltage switch to ground upon a short circuit at the output to an excess voltage.

4 Claims, 1 Drawing Sheet

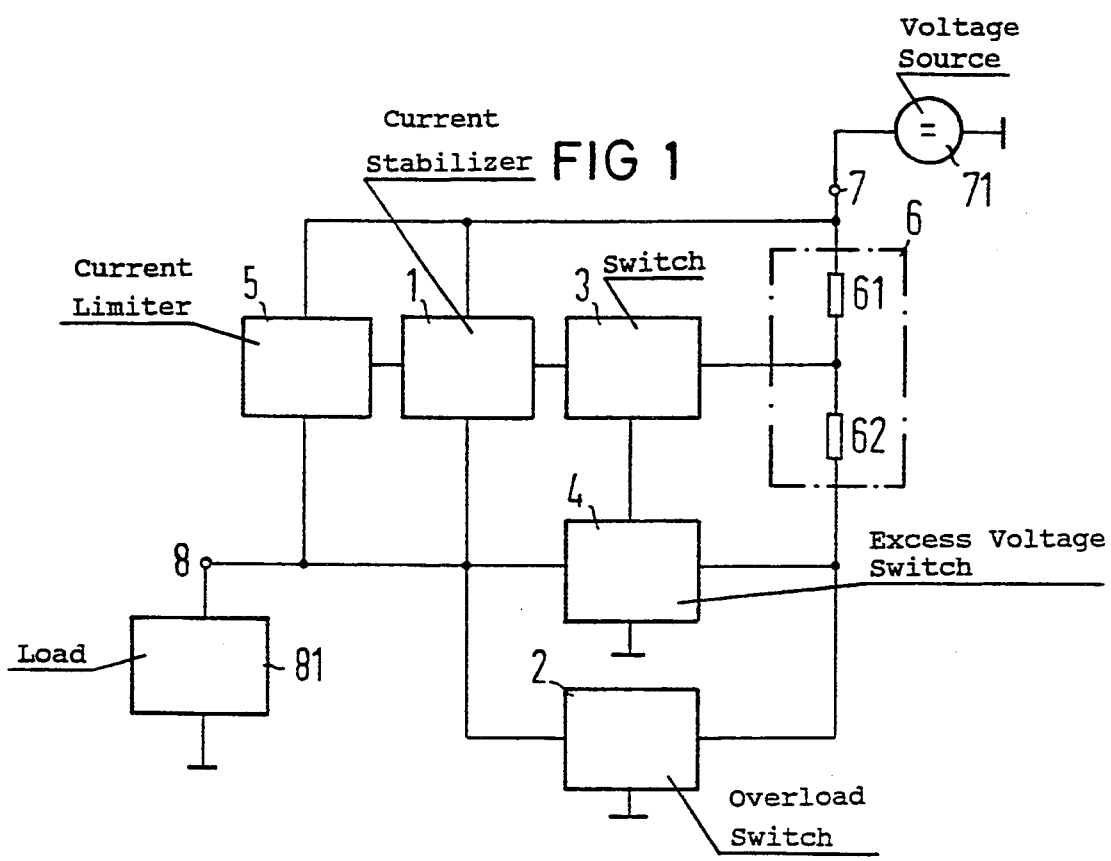
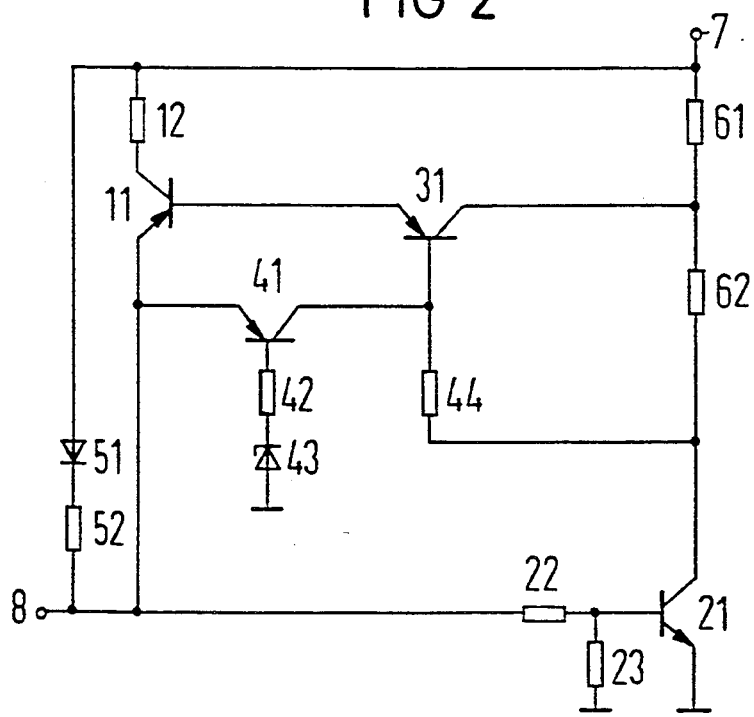

CIRCUIT CONFIGURATION FOR PROTECTING THE ON-BOARD ELECTRICAL SYSTEM OF A MOTOR VEHICLE

SPECIFICATION

The invention relates to a circuit configuration for protecting the on-board electrical system of a motor vehicle, having an input connected to a voltage source, an output connected to a load, and a ground connection being common to both the input and the output.

German Published, Non-Prosecuted Application DE 35 37 920 A, corresponding to U.S. Pat. No. 4,723,191, describes a circuit configuration with protection against an excess voltage, particularly for use in motor vehicles. That circuit configuration has an input connected to a voltage source and an output at which a reference voltage for an electrical load or consumer is made available. The circuit configuration absorbs all of the electrical loads that are established at its input. In particular, in order to protect the load or consumer, it absorbs the excess voltages that may occur if there is a defect in the on-board electrical system of a motor vehicle.

Besides the voltage source at the input, the known circuit configuration requires one further voltage source, and it provides protection only for the load at its output, if an excess voltage is present at its input.

It is accordingly an object of the invention to provide a circuit configuration for protecting the on-board electrical system of a motor vehicle, which overcomes the hereinaforementioned disadvantages of the heretofore-known devices of this general type and which protects the voltage source at the input against destruction.

With the foregoing and other objects in view there is provided, in accordance with the invention, a circuit configuration for protecting the on-board electrical system of a motor vehicle, comprising an input connected to a voltage source; an output connected to a load or consumer; a ground connection being common to both the input and the output; a current stabilizer for regulating an output current; a switch connected to the current stabilizer for controlling the current stabilizer as a function of the output current; a current limiter connected to the current stabilizer; an excess voltage switch connected to the switch; and an overload switch connected to the current limiter and to the excess voltage switch for carrying an overload current from the input through the current limiter to the output upon the appearance of an overload at the output, and for carrying a short-circuit current from the output through the excess voltage switch to ground upon a short circuit at the output to an excess voltage.

In accordance with another feature of the invention, there is provided a voltage divider being connected to the input and having a divider point; the overload switch being connected between the voltage divider and the output; the excess voltage switch being connected between the output and the voltage divider; the current stabilizer being connected between the input and the output; the current limiter being connected parallel to the current stabilizer; and the switch being connected to the divider point of the voltage divider.

In accordance with a further feature of the invention, the current stabilizer includes a first resistor and a first transistor having a collector connected to the first resistor, an emitter connected to the output, and a base; the overload switch includes a second transistor having an emitter connected to ground and a base, a second resistor connected between the base of the second transistor and the output, and a third resistor connected between the base of the second transistor and ground; the current limiter includes a diode and a fourth resistor connected in series with the diode; the switch is a third transistor having a collector connected to the divider point of the voltage divider, an emitter is connected to the base of the first transistor, and a base; and the excess voltage switch includes a fourth transistor having a collector connected to the base of the third transistor and a base, a fifth resistor and a Zener diode connected between the base of the fourth transistor and ground, and a sixth resistor connected between the collector of the fourth transistor and the voltage divider.

In accordance with a concomitant feature of the invention, the current stabilizer, the overload switch, the current limiter, the switch and the excess voltage switch are integrated together in the circuit configuration.

The advantages of the invention are among others that the circuit configuration is made up of economical and simple components and needs no further reference voltage. It can be constructed as an integrated circuit.

Other features which are considered as characteristic for the invention are set forth in the appended claims.

Although the invention is illustrated and described herein as embodied in a circuit configuration for protecting the on-board electrical system of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a block circuit diagram of a circuit configuration according to the invention; and FIG. 2 is a schematic diagram of a circuit configuration of FIG. 1 in a more detailed view.

Various electrical components in motor vehicles, such as potentiometers, which are used as sensors require a reference voltage to which analog measurement outputs can be referred. If the reference voltage is furnished directly by a control unit, a danger exists which is that if there is an overload at the output of a control unit, such as a short circuit to ground, or an excess voltage, such as a short circuit to the battery voltage, the control unit will be destroyed by an overly high output current. Such an occurrence is prevented by the circuit configuration according to the invention, which is disposed between a control unit and a load or consumer.

Referring now to the figures of the drawing in detail and first, particularly, to FIG. 1 thereof, there is seen a circuit configuration that is used in an on-board electrical system of a motor vehicle and has a current stabilizer 1, an overload switch 2, a switch 3, an excess voltage switch 4, a current limiter 5 and a voltage divider 6. The control unit, which serves as a voltage source 71, is connected to an input 7 of the circuit configuration, and an electrical load or consumer 81 is connected to an output 8 of the circuit configuration.

The current stabilizer 1 regulates the output current in such a way that the reference voltage, which is also equal to the output voltage of the circuit configuration, remains nearly constant. The current stabilizer 1 is controlled by the switch 3 in accordance with the output current. Upon the occurrence of an overload, the overload switch 2 carries the overload current from the input 7 to the output 8 through the current limiter 5 and limits the overload current through the use thereof. If there is a short circuit at the output 8 to an excess voltage, the excess voltage switch 4 limits a short-circuit current and carries it from the output to ground.

Two resistors 61 and 62 of the voltage divider 6 define an operating point for the switch 3 and also prevent the current, which in the case of the excess voltage flows from the input 7 to ground, from overly severely loading the voltage source 71.

As seen in FIG. 2, a pnp transistor 11 and a resistor 12 connected to its collector form the current stabilizer 1. The switch 3 is constructed as a pnp transistor 31 having an emitter which is connected to the base of the transistor 11. The collector of the transistor 31 is connected to the divider point of the voltage divider 6, or in other words to the resistors 61 and 62.

Acting as the overload switch 2 is an npn transistor 21, having an emitter which is connected to a ground that is common to both the input 7 and the output 8. The base of the transistor 21 is controlled through a further voltage divider having two resistors 22 and 23, by means of the voltage that is applied to the output 8. The collector of the transistor 21 is connected to the input 7 through the voltage divider 6.

The excess voltage switch 4 is disposed between the output 8 and the voltage divider 6. The excess voltage switch 4 includes a pnp transistor 41, a resistor 42, a Zener diode 43 and a resistor 44. The base of the transistor 41 is connected to ground through the resistor 42 and the Zener diode 43. The collector of the transistor 41 leads on one hand to the base of the transistor 31 and on the other hand to the resistor 44, which in turn is connected to both the resistor 62 and the collector of the transistor 21.

The current limiter 5 is constructed as a diode 51 in series with a resistor 52. The current limiter 5 is disposed between the input 7 and the output 8 and is parallel to the current stabilizer 1.

In the normal mode, the output current is regulated within certain limits if a constant voltage is present at the input 7. The output voltage is then less than the input voltage, by a voltage drop caused by the circuit configuration. The circuit configuration can assume two further operating states, if the output voltage changes because of external factors. This is the case, for instance, if a defect causes a short circuit at the output 8 to ground or to an excess voltage.

A voltage of +5 V, for instance, is present at the input 7. This voltage can be supplied by an ignition control unit. In normal operation, the transistor 21 is controlled and made conducting thereby, through the diode 51, the resistor 52 and the resistor 22. Since in this case the collector-to-emitter path of the transistor 21 has low impedance, a voltage near 0 V is present at the collector. This voltage is thus also present at the base of the transistor 31, through the resistor 44. As a result, the transistor 31 is conducting, and consequently the transistor 11 is conducting as well.

If the resistance of the resistor 12 is much lower than that of the resistor 52 and that of the series circuit Of the resistors 61 and 62, then the majority of the output current flows through the resistor 12 and the transistor 11. The lower the resistance of the resistor 12, the lower the voltage drop, caused by the output current, between the input 7 and the output 8.

In the example described in this case, the resistance of the resistor 12 is approximately 2.7 Ohms. In order to ensure that the transistor 41 will block in this operating state, the Zener diode 43 has a breakdown voltage that is higher than the input voltage of +5 V, minus the emitter-to-base voltage of the transistor 41, which is approximately 0.7 V. In other word, the breakdown voltage must be higher than +4.3 V.

If the output current that flows through the resistor 12 and the transistor 11 increases, then the voltage drop from the input 7 to the output 8 will be greater, so that the transistor 21 and thus the transistor 31 shift from the conducting state to the blocking state. The transistor 11 is thus controlled by the transistor 31, the collector-to-emitter path of the transistor 11 becomes higher in impedance, and the output current drops again. The output current in this exemplary embodiment is regulated if it is less than 10 mA.

The circuit configuration assumes a second operating state if an overload at the output, for example from a short circuit to ground, is present because of a defect at the output 8. Due to the overload, the output current rises sharply and the output voltage collapses and then amounts to only approximately 0 V. The transistor 21 blocks, and with it the transistor 31 that blocks the transistor 11 also blocks. In this operating state, the overload current flows from the input 7 to the output 8 through the diode 51 and the resistor 52. The resistor 52 limits the short-circuit current so that the current source 71 is not overloaded. The diode 51 prevents a current flow from the output 8 to the input 7.

In a further operating state, a defect may cause excess voltage at the output 8. This excess voltage may be the battery voltage of +12 V of the on-board electrical system. If this excess voltage exceeds the breakdown voltage of the Zener diode 43 plus the emitter-to-base voltage of the transistor 41, which is approximately 0.7 V, then the transistor 41 is conducting. Since the voltage drop at the resistor 22 is low, the excess voltage is also present at the base of the transistor 21, making it conducting. The shortcircuit current thus flows from the output 8 to ground through the transistor 41, the resistor 44 and the transistor 21.

If the transistor 41 is conducting, then a high voltage is also present at the base of the transistor 31. The transistor 31 thus blocks, and a voltage that is somewhat less than the excess voltage is present at the base of the transistor 11. Since the voltage difference between the voltage at the base of the transistor 11 and the input voltage would destroy the base-to-emitter path of the transistor 11, this transistor is operated inversely.

To this end, the emitter of the transistor 11 is connected to the output 8, and its collector is connected to the resistor 12, which is located at the input 7. In the case of a short circuit to an excess voltage, a current still flows from the input 7 to ground, but it is limited by the resistors 61 and 62.

The resistance of the resistor 22 is approximately 10 kOhms. The resistance of each resistor 23 and 42 is approximately 4.7 kOhms, and that of the resistor 52 is approximately 100 Ohms. The resistance of the resistor 44 is approximately 5 kOhms. The resistor 61 has a resistance of approximately 220 Ohms, and resistor 62 has a resistance of approximately 330 Ohms.

With this dimensioning of the resistors, an output current of from 3 to 8 mA flows during normal operation. If the output current is less than 10 mA, then the maximum voltage drop between the input 7 and the output 8 is approximately 300 mV.

If there is a short circuit to ground, the voltage source 71 is loaded by the short-circuit current of approximately 33 mA to 66 mA. If there is a short circuit to an excess voltage, a maximum of 10 mA flows from the input 7 to ground.

With this circuit configuration, no current flows into the input 7, even in the event of a short circuit at the output 8 to a positive or negative excess voltage. If there is an excess voltage or an overload at the output 8, the voltage source 71 is loaded only slightly and thus is protected against being destroyed.

The circuit configuration described herein may be constructed in either discrete circuitry or as an integrated circuit. If the circuit has a discrete structure, the transistors 11, 31 and 41 may be constructed as a BC 327, and the transistor 21 may be constructed as a BC 338, or in the form of other presently obtainable and functionally equivalent transistors. The diode 51 is of the 1N4148 type, and the Zener diode 43 is of the ZPD type, with a breakdown voltage of 6.2 V.

The term "on-board electrical system" is understood to be the entire electrical system in a motor vehicle. It includes the battery, control units and other electrical loads or consumers, among other elements.

We claim:

1. A circuit configuration for protecting the on-board electrical system of a motor vehicle, comprising:
   an input connected to a voltage source;
   an output connected to a load;
   a ground connection being common to both said input and said output;
   a current stabilizer connected between said input and said output for regulating an output current;
   a switch connected to said current stabilizer for controlling said current stabilizer as a function of the output current;
   a current limiter connected to said current stabilizer;
   an excess voltage switch connected to said switch; and
   an overload switch connected to said current limiter and to said excess voltage switch;
   said overload switch carrying an overload current from said input through said current limiter to said output upon the appearance of an overload at said output, whereby the overload current is limited by said current limiter; and
   said overload switch carrying a short-circuit current from said output through said excess voltage switch to ground upon a short circuit at said output to an overvoltage.

2. The circuit configuration according to claim 1, including
   a voltage divider being connected to said input and having a divider point;
   said overload switch being connected between said voltage divider and said output;
   said excess voltage switch being connected between said output and said voltage divider;
   said current stabilizer being connected between said input and said output;
   said current limiter being connected parallel to said current stabilizer; and
   said switch being connected to the divider point of said voltage divider.

3. The circuit configuration according to claim 2, wherein
   said current stabilizer includes a first resistor and a first transistor having a collector connected to said first resistor, an emitter connected to said output, and a base;
   said overload switch includes a second transistor having an emitter connected to ground and a base, a second resistor connected between the base of said second transistor and said output, and a third resistor connected between the base of said second transistor and ground;
   said current limiter includes a diode and a fourth resistor connected in series with said diode;
   said switch is a third transistor having a collector connected to the divider point of said voltage divider, an emitter is connected to the base of said first transistor, and a base; and
   said excess voltage switch includes a fourth transistor having a collector connected to the base of said third transistor and a base, a fifth resistor and a Zener diode connected between the base of said fourth transistor and ground, and a sixth resistor connected between the collector of said fourth transistor and said voltage divider.

4. The circuit configuration according to claim 3, wherein said current stabilizer, said overload switch, said current limiter, said switch and said excess voltage switch are integrated together in the circuit configuration.

* * * * *